United States Patent
Barton et al.

(10) Patent No.: US 6,909,822 B2
(45) Date of Patent: Jun. 21, 2005

(54) WAVELENGTH SEPARATION ELEMENTS FOR DENSE WAVELENGTH DIVISION MULTIPLEXING SYSTEMS

(75) Inventors: Ian Michael Barton, San Diego, CA (US); Steve Mathew Herman, Carlsbad, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 10/197,930

(22) Filed: Jul. 16, 2002

(65) Prior Publication Data

US 2003/0068124 A1 Apr. 10, 2003

Related U.S. Application Data

(60) Provisional application No. 60/327,505, filed on Oct. 5, 2001.

(51) Int. Cl.[7] .............................. G02B 6/28; G02B 6/34
(52) U.S. Cl. .............................. 385/24; 385/37; 398/84; 398/85
(58) Field of Search ........................ 385/24, 37, 31–36; 398/81–88

(56) References Cited

U.S. PATENT DOCUMENTS 6,343,866 B1 * 2/2002 Cao et al. .................... 359/868
6,625,346 B2 * 9/2003 Wilde .......................... 385/24

* cited by examiner

*Primary Examiner*—Hemang Sanghavi
(74) *Attorney, Agent, or Firm*—John P. Wooldridge

(57) ABSTRACT

Systems are described that disperse the wavelength bands corresponding to the channel centers at a faster rate than the bandwidth of the channels themselves. An embodiment consists of a double element system including a grating, to create the initial separation, and a segmented mirror with multiple flat facets of different tilt, which reflect each spatially separated channel at a different angle. The size, position and angle of the facets are designed to match the spacing and position of individual channels of known wavelength and number that are diffracting from a grating with a predefined period, a set distance from this device. This system enables the individual channels to be re-imaged at some later point with a large separation between the channels, relative to their spatial size.

20 Claims, 3 Drawing Sheets

WAVELENGTH SEPARATION ELEMENTS FOR DENSE WAVELENGTH DIVISION MULTIPLEXING SYSTEMS

This application claims the benefit of Provisional Application No. 60/327,505 filed Oct. 5, 2001.

BACKGROUND OF THE INVENTION

1. Field of the Invention

The present invention relates to the field of dense wavelength division multiplexing (DWDM) optical telecommunication components, and more particularly, it relates to passive multiplexing or demultiplexing devices, which separate multiple channels of light co-propagating in one optical fiber into multiple individual fibers (or the reverse).

2. Description of Related Art

The amount of data that can be transferred using an optical fiber is based on the bandwidth that the fiber can support This value can be very large for modern fibers, leading to a theoretical limit of >10 Tbits/s for a single fiber cable link. However, in practice this bandwidth cannot be fully utilized, primarily due to electronic limitations in the generation and reception of laser beams modulated at this very fast rate. Wavelength division multiplexing (WDM) is way to utilize more of the available bandwidth in an optical fiber by sending multiple individual channels, with different wavelength, down a single fiber. The achievable data rate is now dependent on the number of channels multiplied by the data rate in each channel, which contains data at a rate able to be processed by modern electronics. WDM and Dense-WDM (DWDM) systems have been deployed extensively for long-haul telecommunications links and are now being installed in shorter-range links such as metropolitan areas.

One of the key components for DWDM systems is a device which allows multiple beams of light, each having a slightly different wavelength corresponding to a communication channel, which are co-propagating in a single-mode optical fiber, to be separated spatially so that the information in each channel can be processed. Also, the reverse of this is needed, whereby individual channels having different wavelengths are recombined from individual fiber optic cables into a single cable. The performance of these devices is determined by their size and stability, the losses that each output channel incurs, and the amount of stray light that leaks between channels (cross-talk).

Prior art exists for various technical solutions to this problem. Early solutions used a prism to provide the chromatic separation. For example, see U.S. Pat. No. 3,845,294, titled "Multiplexed Communications System", issued Oct. 29, 1974. U.S. Pat. No. 3,863,063, titled "Optical Communications Systems" issued Jan. 28, 1975, also describes a pulse-shaping system that uses a diffraction grating to cause chromatic dispersion, but this was not a multiplexer device. A diffraction grating was used within a low loss multiplexing system in U.S. Pat. No. 4,111,524, titled "Wavelength Division Multiplexer", issued Sep. 5, 1978).

Other methods for multiplexing include multiple thin-film interference filters (see e.g., U.S. Pat. No. 4,474,424, titled "Optical Multi/Demultiplexer Using Interference Filters" issued Oct. 2, 1984); fiber-based interferometers incorporating fiber Bragg grating filters (see e.g., U.S. Pat. No. 5,457,760 titled "Wavelength Division Optical Multiplexing Elements" issued Oct. 10, 1995); and arrayed waveguide gratings (see e.g., U.S. Pat. No. 5,913,000 titled "Method And Apparatus For Guiding Optical Signals" issued Jun. 15, 1999). There are many others examples of patented concepts in this area, where these basic system designs are modified to improve loss, package size, and cost. Relevant examples are: U.S. Pat. No. 5,526,155 titled "High-Density Optical Wavelength Division Multiplexing" issued Jun. 11, 1996; U.S. Pat. No. 5,355,237, titled "Wavelength-Division Multiplexed Optical Integrated Circuit With Vertical Diffraction Grating" issued Oct. 11, 1994 and U.S. Pat. No. 4,930,855, titled "Wavelength Multiplexing Of Lasers" issued Jun. 5, 1990.

It is desirable to provide control over the separation or combination properties of the individual wavelength channels of passive multiplexing or demultiplexing devices in the most recent types of systems (e.g., DWDM systems where there are >80 individual channels, separated by <50 GHz).

SUMMARY OF THE INVENTION

It is an object of the present invention to improve the design of passive multiplexing or demultiplexing devices and systems.

It is another object to provide greater control over the separation (or combination) properties of the individual wavelength channels of passive multiplexing or demultiplexing devices.

Still another object is to provide more flexibility in the number and spacing of channels that can be separated or combined and result in lower losses for passive multiplexing or demultiplexing devices.

These and other objects will be apparent to those skilled in the art based on the disclosure herein.

The chromatic dispersion properties of a grating can be used to separate individual channels of a DWDM system by causing each channel to be diffracted at a different angle. This process causes a spatial separation of the channels (wavelengths) at a later image plane, so that each can be coupled into a different fiber optic. These systems can also be used in reverse, where the light from individual channels are combined into one fiber by using the chromatic dispersion properties of a grating to re-direct each channel by a predetermined amount. Gratings have many advantages over other channel separation/combination methods because the inherent angular separation of the channels can be directly scaled for increasing channel number and decreasing channel spacing systems by changing the position of the output plane.

One disadvantage of using gratings for DWDM systems is that individual channels have a significant bandwidth in themselves (this bandwidth is required to be as large as possible in order to give the maximum data transfer rate), and so the dispersion of the grating also spreads the channel size. This issue becomes more relevant as the channel spacing decreases. Once the channels are initially separated from collinear, further propagation does not change the relative spacing of channel spacing to width. Hence, no matter where the image plane occurs for coupling into the output fibers, the coupling issue is the same, only the scale is increased. This is shown in FIG. 1, where four individual wavelength channels are dispersed and imaged downstream. The spatial size of each channel, due to its bandwidth, increases at the same rate as the channel separation; hence the profile remains the same no matter in what plane imaging occurs, only the magnification increases. This does not fit well with a fiber-optic coupling system, since the core diameter is typically less than one tenth the size of the total diameter of each fiber, including cladding.

One solution to this problem is to create a system that disperses the wavelength bands corresponding to the channel centers at a faster rate than the bandwidth of the channels themselves. This can be achieved by using a double element system consisting of a grating, to create the initial separation, and a segmented mirror with multiple flat facets of different tilt, which reflect each spatially separated channel at a different angle. The size, position and angle of the facets are designed to match the spacing and position of individual channels of known wavelength and number that are diffracting from a grating with a predefined period, a set distance from this device. The tilts induced by each facet of the segmented mirror do not depend on the wavelength separation, which is the case for the grating and is sub-nanometer between channels for DWDM systems, and so can be much greater than the dispersion of the grating. This system enables the individual channels to be re-imaged at some later point with a large separation between the channels, relative to their spatial size.

DETAILED DESCRIPTION OF THE INVENTION

The invention consists of an optical multiplexer/demultiplexer that separates multiple channels of laser light, each with a different wavelength, co-propagating in an optical fiber, into multiple individual fibers (or the reverse operation). The multiplexing and demultiplexing operations are exactly opposite functions, and so the physics for each are the same, with only the operation being reversed, hence the demultiplexing will be considered here and represent both devices. The elements of an embodiment of the invention are:

An optical fiber termination point;

A chromatically dispersive element that redirects the angular profile of light incident upon it by an amount that is dependent on the wavelength, e.g., a diffraction grating;

A second spatially dispersive element that uniformly redirects the angular profile of sections of the light incident upon it based on the spatial position of the beam incident on it, e.g., a mirror composed from multiple flat segments, each with a different tilt; and A one-dimensional array of output optical fibers that are spaced to correlate with wavelength of each channel, the combined dispersion caused by the primary and secondary dispersive element and the distance between elements.

Lenses are used in the system in order to collimate the light incident on the primary dispersive element (diffraction grating) to minimize losses and to focus the light onto the secondary dispersive element and output fiber entrances, to minimize cross talk and provide high output coupling efficiency.

Figure 1:
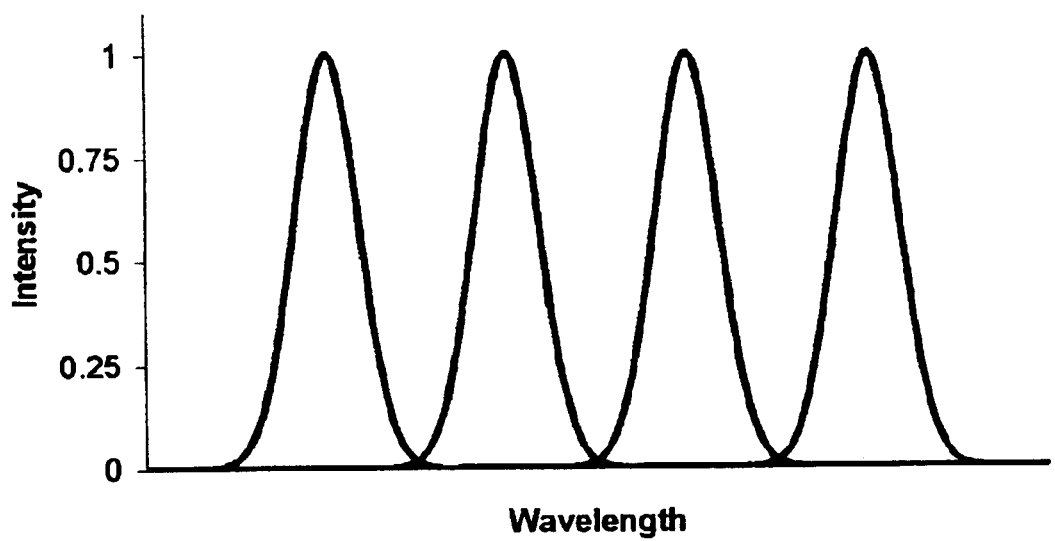
FIG. 1 shows four individual wavelength channels dispersed and imaged downstream.
Figures 2A, 2B:
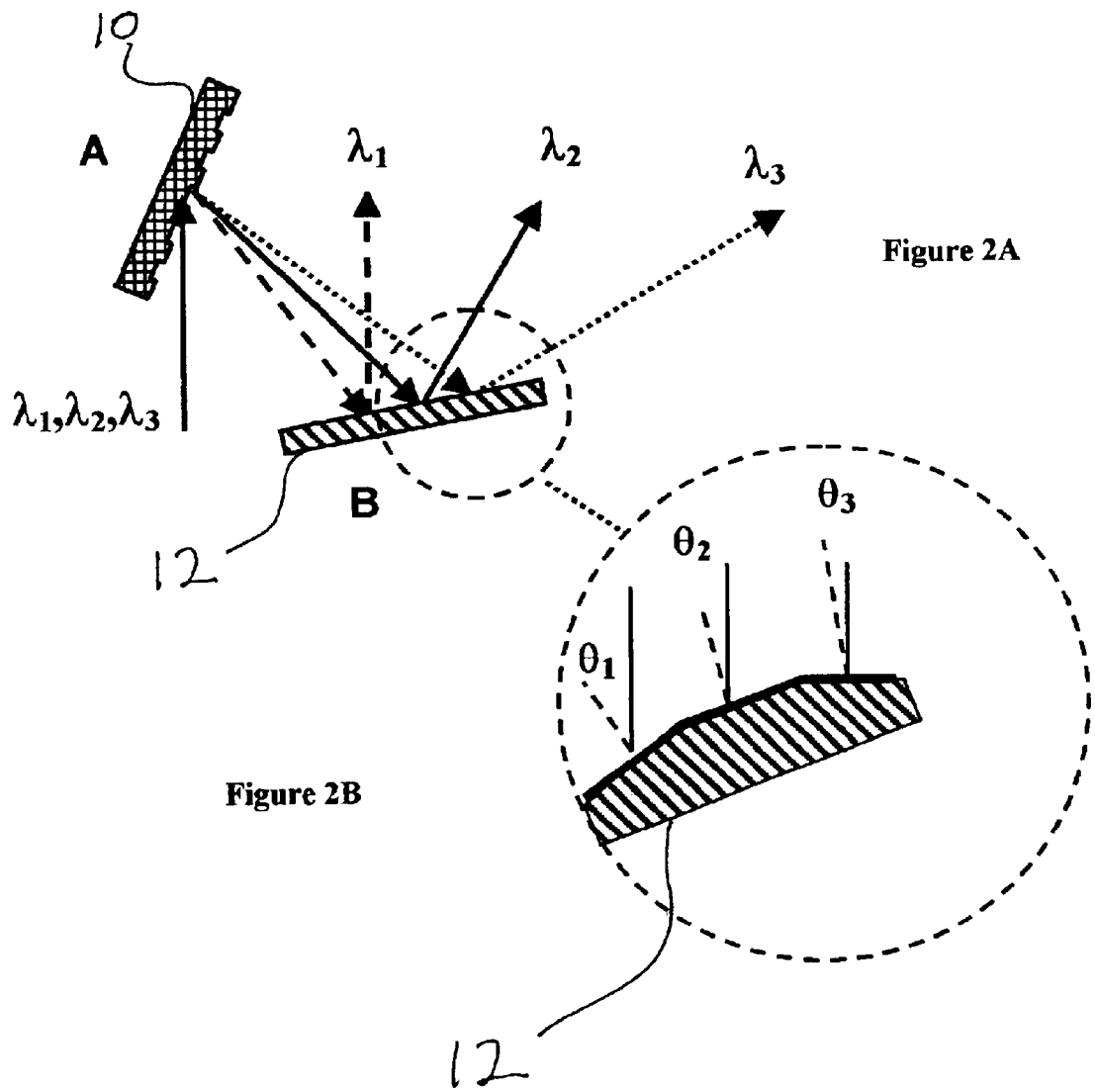
FIG. 2A is a schematic of the operation of an embodiment of the wavelength dispersive elements of the present invention.
FIG. 2B shows an enlarged view of an embodiment of the segmented mirror of FIG. 2A.

The operation of the elements of the invention is shown in FIGS. 2A and 2B. Element 10 is a chromatically dispersive element (e.g., a diffraction grating), element 12 is a spatially dispersive element (e.g., a segmented mirror) and the channels of wavelength $\lambda_1, \lambda_2$ and $\lambda_3$ exit from an optical fiber (not shown) and couple back into three different optical fibers (not shown).

Figure 3A:
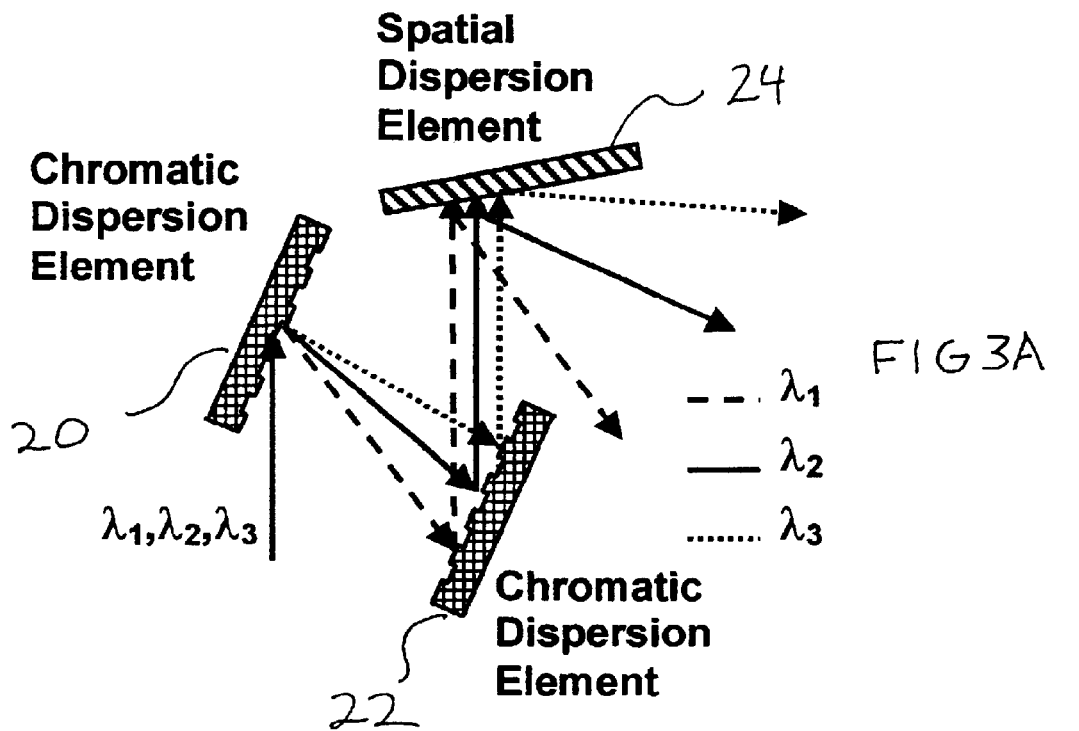
FIGS. 3A and 3B show embodiments of the invention formed by using a matched grating pair as a chromatically dispersive element.
Figure 3B:
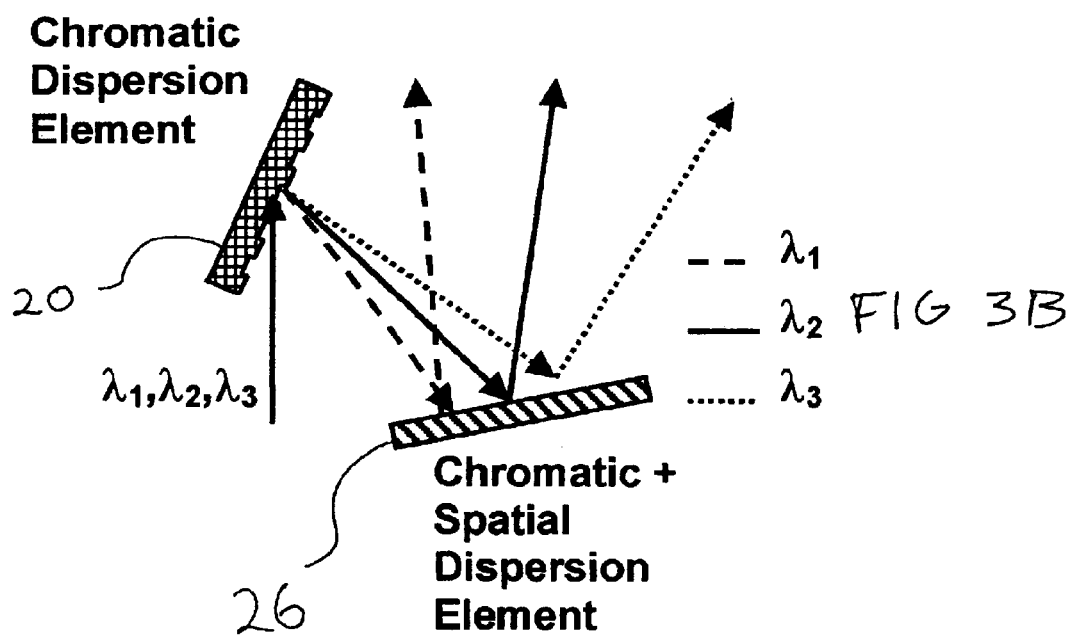

FIGS. 3A and 3B show each shown an embodiment of the invention formed by using a matched grating pair (20, 22) as a chromatically dispersive element The spatially dispersive element 24 is used with the matched grating pair in such a way that residual chromatic dispersion from the first grating 20 is cancelled after the second grating 22 so that the chromatic dispersion in the beam is only from the spatially dispersive element 24. The matched grating pair can be configured to be either prior to the spatially dispersive element, on either side of the spatially dispersive element or, as a single optic 26 as shown in FIG. 3B, with the second grating formed as part of the spatially dispersive element.

The advantages of this invention over the prior art is that the removal of the chromatic dependence on the dispersion by adding the secondary element allows for more densely packed channel systems to be demultiplexed without increasing the size. The tilt from the second element dominates over the dispersion from the grating and so the total dispersion can be significantly higher than that achievable with standard diffraction grating solutions. This is especially true for very tightly spaced channels (e.g., <50 GHz), where the chromatic dependence of the dispersion means that the channel separation is severely limited.

Typical diffraction grating solutions cannot provide improved dispersion, since there is a physical limit on the minimum period (hence maximum dispersion) that a grating can provide, which is based on the wavelength and incidence angle of the light, and is close to the maximum value in current systems. This problem is accentuated as the channel spacing is reduced.

Another useful property of the invention is that the intra-channel dispersion can be made completely uniform. This is not possible with diffraction gratings alone since they disperse the channels proportional to the wavelength and optical telecommunications channels are spaced on an even frequency grid, which means uneven wavelength spacing. In addition, this invention can compactly handle systems that include channels of very different wavelengths (e.g., 1.3 microns) with the main DWDM grid, for diagnostics, or other uses.

An example design process for this device is the following:

1. Determine the number and spacing of channels required to be demultiplexed (multiplexed)
2. Based on the dispersion properties of the primary element (grating period), the channel separation and the distance between the primary and secondary dispersion elements, taking into account focusing optics, find the spacing of each channel center at the secondary element.
3. Design the secondary element with planes of constant tilt separated by the channel center spacing calculated above. The variation between the planes of constant tilt can now be set so that the light striking each plane (which corresponds to one channel) is directed towards a specific output fiber in an array of given spacing. The tilt variation is therefore predominantly determined by the separation between the secondary dispersion element and the spacing of the output fibers.

To compare the dispersion properties of this invention with that of the standard diffraction grating approach for a 100 channel, 50 GHz spaced DWDM system, consider a diffraction grating at the Littrow angle (for maximum efficiency); the smallest feasible period is ~1 μm, giving a maximum dispersion of 0.036° between channel centers. The proposed device can be designed, using a segmented mirror with 0.1° tilt difference per channel so that the angular separation of each channel center is 0.136°. This has four times the separation of the channel centers and significantly better dispersion properties as noted earlier.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

We claim:

1. A demultiplexing apparatus, comprising:
    a chromatically dispersive element that redirects light incident upon it by an amount that is dependent on wavelength to produce a plurality of wavelength channels each having a distinct angular profile; and
    a spatially dispersive element positioned to redirect each wavelength channel of said plurality of wavelength channels based on the spatial position of each said wavelength channel on said spatially dispersive element.

2. The apparatus of claim 1, wherein said chromatically dispersive element comprises a grating.

3. The apparatus of claim 1, wherein said spatially dispersive element comprises a segmented mirror.

4. The apparatus of claim 3, wherein said segmented mirror comprises multiple facets, wherein each facet of said multiple facets comprises a different tilt which reflect said wavelength channel at a different angle.

5. The apparatus of claim 4, wherein at least one facet of said facets is flat.

6. The apparatus of claim 4, wherein said each facet comprises a size, a position and an angle that is designed to match the spacing and position of individual channels of known wavelength and number that are diffracting from said reflecting optic with a predefined period, at a set distance.

7. The apparatus of claim 1, further comprising means for imaging said each spatially separated channel.

8. The apparatus of claim 1, further comprising an input optical fiber operatively positioned to provide said light to said chromatically dispersive element.

9. The apparatus of claim 1, further comprising a one-dimensional array of output optical fibers that are spaced to correlate with a wavelength channel wavelength of said plurality of wavelength channels.

10. A multiplexing apparatus, comprising:
    a spatially dispersive element positioned to redirect each wavelength channel of a plurality of wavelength channels based the spatial position of each said wavelength channel on said spatially dispersive element; and
    a chromatically dispersive element that redirects said plurality of wavelength channels incident upon said chromatically dispersive element by an amount that is dependent on wavelength to produce a beam of light having a plurality of wavelength channels.

11. A method for demultiplexing light, comprising:
    redirecting light with a chromatically dispersive element that redirects light incident upon it by an amount that is dependent on wavelength to produce a plurality of wavelength channels each having a distinct angular profile; and
    redirecting each wavelength channel of said plurality of wavelength channels with a spatially dispersive element positioned to redirect each wavelength channel based on its spatial position on said spatially dispersive element.

12. The method of claim 11, wherein said chromatically dispersive element comprises a grating.

13. The method of claim 11, wherein said spatially dispersive element comprises a segmented mirror.

14. The method of claim 13, wherein said segmented mirror comprises multiple facets, wherein each facet of said multiple facets comprises a different tilt which reflect said wavelength channel at a different angle.

15. The method of claim 14, wherein at least one facet of said facets is flat.

16. The method of claim 14, wherein said each facet comprises a size, a position and an angle that is designed to match the spacing and position of individual channels of known wavelength and number that are diffracting from said reflecting optic with a predefined period, at a set distance.

17. The method of claim 11, further comprising imaging said each spatially separated channel.

18. The method of claim 11, further comprising providing said light to said chromatically dispersive element with an input optical fiber.

19. The method of claim 11, further comprising positioning a one-dimensional array of output optical fibers in a spaced relationship to correlate with a wavelength channel wavelength of said plurality of wavelength channels.

20. A method for multiplexing light, comprising:
    positioning a spatially dispersive element to redirect each wavelength channel of a plurality of wavelength channels based on the spatial position of each said wavelength channel on said spatially dispersive element; and
    positioning a chromatically dispersive element to redirect said plurality of wavelength channels incident upon said chromatically dispersive element by an amount that is dependent on wavelength to produce a beam of light having a plurality of wavelength channels.

* * * * *